Figure 1:
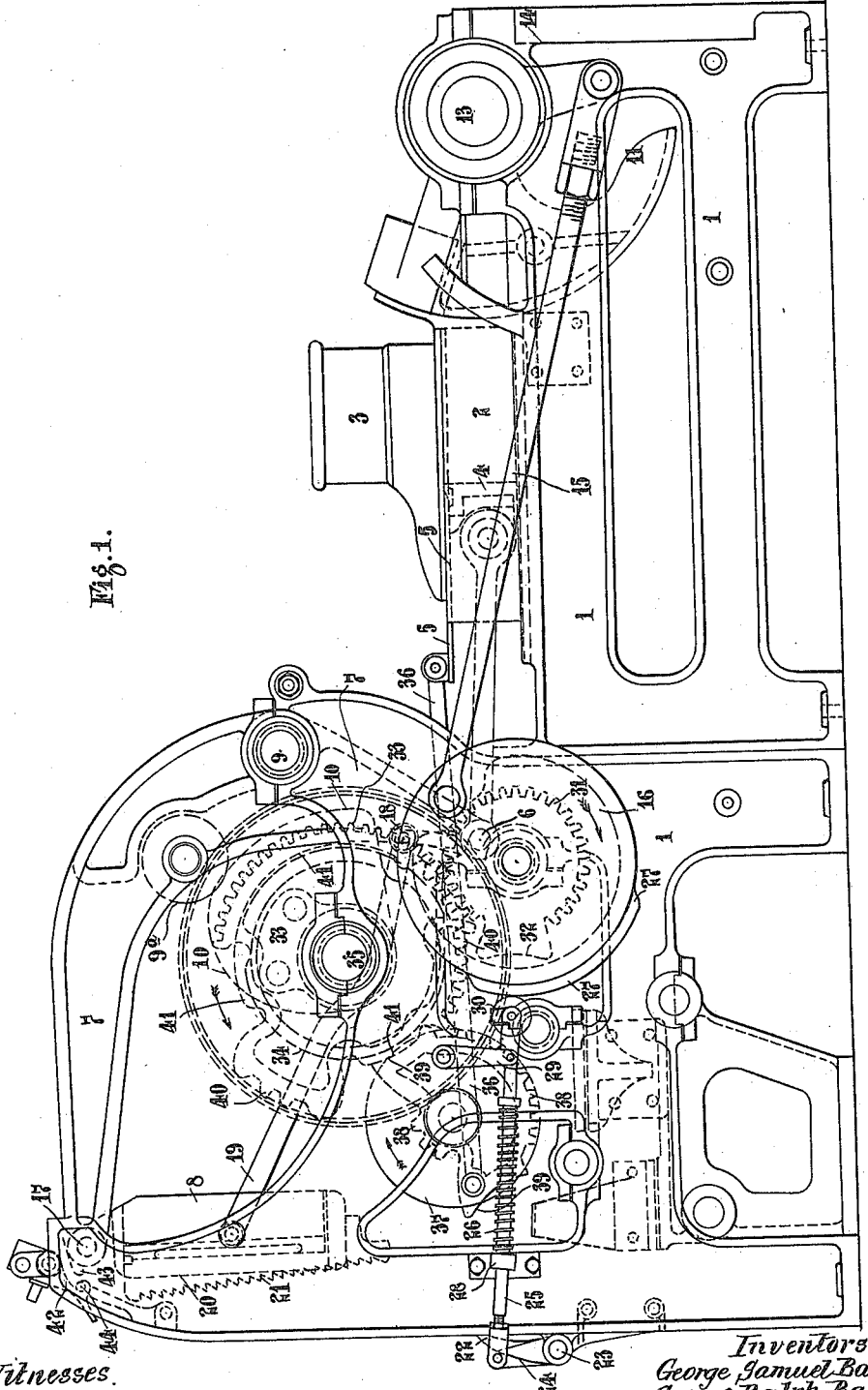

G. S. & G. R. BAKER.
MACHINE FOR DIVIDING DOUGH AND LIKE PLASTIC SUBSTANCES.
APPLICATION FILED OCT. 11, 1913.

1,162,898.

Patented Dec. 7, 1915.
2 SHEETS—SHEET 1.

Witnesses.
C. H. Walt
H. Melhuish

Inventors:
George Samuel Baker.
George Ralph Baker.
By
Attorney.

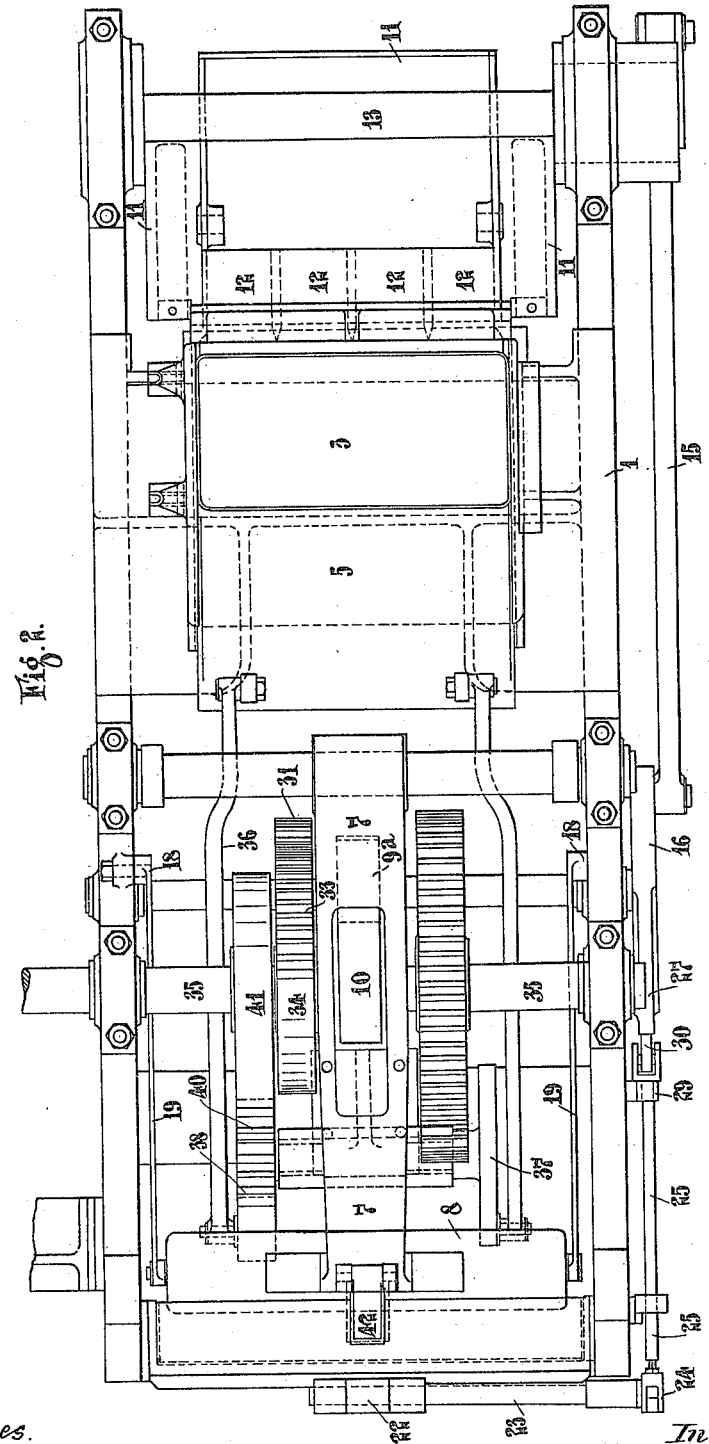

UNITED STATES PATENT OFFICE.

GEORGE SAMUEL BAKER AND GEORGE RALPH BAKER, OF LONDON, ENGLAND.

MACHINE FOR DIVIDING DOUGH AND LIKE PLASTIC SUBSTANCES.

1,162,898. Specification of Letters Patent. Patented Dec. 7, 1915.

Application filed October 11, 1913. Serial No. 794,577.

*To all whom it may concern:*

Be it known that we, GEORGE SAMUEL BAKER and GEORGE RALPH BAKER, subjects of the King of England, residing at London, in England, have invented certain new and useful Improvements in Machines for Dividing Dough and like Plastic Substances, of which the following is a specification.

This invention relates to machines for dividing dough and like plastic substances, more particularly of that type in which a portion of dough fed into a hopper is cut off therein by a reciprocating knife and forced by a weight operated plunger into one or more measuring chambers or boxes, which may have means for adjusting their capacity, and usually adapted to rock into and out of communication with said hopper.

In such machines hitherto constructed the plunger acts under the action of the weight continuously upon the dough in the pressure-portion of the hopper below the knife, and if the capacity of the measuring chamber is so adjusted that a greater or less quantity of dough remains in said pressure-portion of the hopper it results that on withdrawal of the knife the plunger acts to force the remaining dough upward or outward in the hopper. Attempts have been made to remedy this defect by allowing the knife to remain as long as possible in its forward position (that is to say, separating the pressure-portion from the remainder of the hopper) and then quickly withdrawing same, but it has been found that the plunger which has been previously moved back on its return stroke sucks air into the pressure-space below the knife, which air has to be displaced before a fresh charge of dough can enter.

The primary object of the present invention is to obviate the above mentioned disadvantages, and to this end consists in means for preventing the action of the weight-actuated plunger on the dough after a portion has been fed into the measuring-box until said box again arrives in communication with the hopper for a fresh charge, thus avoiding the dough being forced back into the hopper when the knife is withdrawn.

The invention further relates to means for preventing the air-pocket or space above referred to in the pressure-portion of the hopper and this is effected by imparting a slow return movement to the knife, this movement taking place at the same speed as that of the return movement of the plunger, and these movements being so controlled that during such return movement of the plunger (the commencement of which varies with the amount of dough remaining in the pressure-portion of the hopper), the knife is moving back with it. By this arrangement a suctional effect is exerted on the dough in the hopper above the knife thus causing the lower or pressure-portion of the hopper to be quickly refilled.

An embodiment of the invention is represented in the accompanying drawings, in which—

Figure 1 is a side elevation of a dough dividing machine having the improvements of the present invention applied thereto, and Fig. 2 is a plan view of Fig. 1.

In said drawings, 1, 1 designate the side frames of the machine, 2 the hopper having the inlet 3, 5 the knife adapted to be reciprocated horizontally across the hopper, and 4 the plunger actuated by being operatively connected at 6 to the lever 7 provided at its opposite end with a weight 8 which operates it in one direction. Said lever 7 is pivoted at 9 and is provided with an antifriction roller 9ª with which engages a cam 10 which operates the lever in the opposite direction.

11 designates the quadrant which contains any suitable number of measuring boxes 12, the present machine being shown as provided with four such boxes, said quadrant being mounted on shaft 13 and rocked by means of an arm 14, connecting rod 15 and crank disk 16.

All the parts above described are substantially known and it is to a machine of such construction that the present improvements are shown as applied, although said improvements are equally applicable to other types of machines having the same general functions as described in the first paragraph of this specification.

The aforesaid weight 8 is pivoted at 17 to the lever 7 and is connected to the machine frame at the points 18 by means of radius rods 19, so that during the movements of said lever the weight is compelled to follow a definite path. Securely attached to the weight is a ratchet rack or equivalent 20, the teeth 21 of which are capable of engaging with a pawl or detent 22 pivotally mounted on the rear of the machine frame at 23, the pawl being operated through an arm 24 and rod 25 in one direction, that is, into engagement with the rack teeth by a spring 26 coiled about said rod, and in the opposite direction, viz. out of engagement with said teeth by a cam 27, which as shown is formed as part of the crank disk 16 from which the quadrant 11 is operated.

The rod 25 is shown as mounted near one end in a bearing 28 and near the other end suspended by a link 29, this latter end having an antifriction roller 30 for engagement by the cam 27.

The pawl 22 acts to arrest the downward or active movement of the weight 8 and lever 7 and consequently the forcing or pressure action of the plunger 4. The pawl 22 is caused to engage the rack-teeth 21 as soon as the measuring-box 12 in the quadrant 11 moves away with its charge from the feed-hopper 2, and remains in engagement with said rack-teeth through substantially the entire range of rearward movement of the plunger 4, that is to say, until the latter is about to commence a new forcing or pressure stroke, whereupon the pawl is released from the rack-teeth by the cam 27 acting through rod 25 and arm 24 which positively removes said pawl from engagement and allows it to reëngage the rack by means of the spring 26, when the cam 27 ceases to act on the rod 25.

According to the amount of dough remaining in the hopper the pawl engages the rack at different points thereof and during the return of the plunger and consequent lifting of the weight of the cam 10 which acts on the lever 7, the pawl trips over the rack-teeth until its final release therefrom, which takes place when the weight is entirely lifted, this time corresponding with that of the extreme rearward point of the plunger's travel. It will thus be seen that by providing such auxiliary means for temporarily supporting the weight while the measuring-box is out of communication with the feed hopper that no pressure by the plunger is exerted on the dough until a fresh charge is to be forced into the box.

Any appropriate or desired mechanism may be adopted for securing the proper sequence or cycle of movements of the parts, but as shown in the drawings the crank disk 16 which operates the quadrant 11 is actuated by interrupted gearing comprising a partially toothed wheel 31 having stop portion 32 mounted on the same shaft as said disk, and with which gears a partially toothed wheel 33 having stop portion 34 mounted on a shaft 35 on which is also mounted the aforesaid cam 10 operating the lever 7. The knife 5 is moved through the rods 36 one at each side, one of which is pivoted at its rear end to a disk 37 and the other to a wheel 38 forming part of a double interrupted gearing comprising said wheel 38 on the same shaft as the disk and which is partially toothed and provided with two stop portions 39, and a partially toothed wheel 40 on shaft 35 provided with two stop portions 41.

By this construction after a period of rest during which the hopper is open for feeding in the dough, the knife is given a quick forward movement to close the hopper followed by a period of rest during the forcing of the dough into the measuring-box or boxes and then a slow return movement at the same speed as that of the plunger while the measuring box is out of communication with the hopper the gearing and cam 10 being so designed that when the forward edge of the knife on its return movement reaches the forward face of the plunger (the moment of return of which depends on the amount of dough remaining in the hopper) both knife and plunger move back together at the same speed.

42 shows a hand operable catch adapted to engage a rod 43 on the lever 7 when the machine is out of operation. During working as shown this catch may be shifted onto a pin 44 to hold it out of action. The gearing by which the shaft 35 is driven is omitted for sake of clearness as it forms no part of the present invention and may be of any appropriate character.

We do not limit ourselves to the particular construction, arrangement and combination of parts hereinbefore described and illustrated in the drawings, since the same may be varied within limits prescribed by the appended claims without departing from the spirit of the invention.

What we claim as our invention and desire to secure by Letters Patent of the United States is:—

1. In a machine for dividing dough and like plastic substances, the combination of a feed hopper, a knife adapted to close and open same, a plunger reciprocating in said hopper, a measuring chamber adapted for movement into and out of communication with the hopper, and means for preventing the action of the plunger on the dough in said hopper after the dough has been forced into the measuring chamber and the latter moved out of communication with the hopper and until said chamber again communicates therewith.

2. In a machine for dividing dough and like plastic substances, the combination of a feed hopper, a knife adapted to close and open same, a plunger reciprocatable in said hopper, a measuring chamber adapted for movement into and out of communication with the hopper, a loaded lever for actuating the plunger to force the dough from the hopper into the measuring chamber and means for arresting the movement of the lever to prevent the action of the plunger on the dough in the hopper after the dough has been forced into the measuring chamber, and the latter moved out of communication with the hopper.

3. In a machine for dividing dough and like plastic substances, the combination of a feed hopper, a knife adapted to close and open same, a plunger reciprocatable in said hopper, a measuring chamber adapted for movement into and out of communication with the hopper, a loaded lever for actuating the plunger to force the dough from the hopper into the measuring chamber, a toothed element carried by said lever and a detent adapted to engage said toothed element at different points according to the amount of material remaining in the hopper when the measuring chamber has moved out of communication therewith, said detent arresting the movement of the lever while the measuring chamber is thus out of such communication.

4. In a machine for dividing dough and like plastic substances, the combination of a feed hopper, a knife adapted to close and open same, a plunger reciprocatable in said hopper, a measuring chamber adapted for movement into and out of communication with the hopper, a loaded lever for actuating the plunger in one direction, a cam acting on the lever for actuating the plunger in the opposite direction, a toothed element carried by said lever, a detent adapted to engage said element and arrest the movement of the lever and plunger while the measuring chamber is out of communication with the hopper, and means for releasing said detent from the toothed element when the measuring chamber reassumes its position of communication with the hopper.

5. In a machine for dividing dough and like plastic substances, the combination of a feed hopper, a reciprocatable knife adapted to close and open same, a plunger reciprocatable in said hopper, a measuring chamber adapted for movement into and out of communication with said hopper, means for preventing the forcing action of the plunger on the dough in said hopper while the measuring chamber is out of communication with the hopper, and means for imparting a slow movement to the knife to open the hopper at the same speed as the non-forcing movement of the plunger.

6. In a machine for dividing dough and like plastic substances, the combination of a feed hopper, a reciprocatable knife adapted to close and open same, a plunger reciprocatable in said hopper, a measuring chamber adapted for movement into and out of communication with said hopper, means for arresting the action of the plunger while the measuring chamber is out of communication with the hopper, single interrupted gearing for actuating the measuring chamber, and double interrupted gearing for actuating the knife.

7. In a machine for dividing dough and like plastic substances, the combination of a feed hopper, a reciprocatable knife adapted to close and open same, a plunger reciprocatable in said hopper, a measuring chamber adapted for movement into and out of communication with said hopper, a loaded lever for actuating the plunger to force the dough from the hopper into the measuring chamber, a toothed element carried by said lever, a detent adapted to engage said toothed element to arrest the movement of the lever while the measuring chamber is out of communication with the hopper, means for releasing the detent from the toothed element when the measuring chamber reassumes its position of communication with the hopper, a cam for producing return movement of the plunger, single interrupted gearing for actuating the measuring chamber, and double interrupted gearing for actuating the knife with a return movement at the same speed as the return movement of the plunger.

In witness whereof we have signed this specification in the presence of two witnesses.

GEORGE SAMUEL BAKER.
GEORGE RALPH BAKER.

Witnesses:
O. J. WORTH,
W. E. ROGERS.